United States Patent [19]

Ford et al.

[11] Patent Number: 4,663,059

[45] Date of Patent: May 5, 1987

[54] COMPOSITION AND METHOD FOR REDUCING SLUDGING DURING THE ACIDIZING OF FORMATIONS CONTAINING SLUDGING CRUDE OILS

[75] Inventors: William G. Ford; Keith H. Hollenbeak, both of Duncan, Okla.

[73] Assignee: Halliburton Company, Duncan, Okla.

[21] Appl. No.: 830,603

[22] Filed: Feb. 17, 1986

[51] Int. Cl.$^4$ ............................................. E21B 43/27
[52] U.S. Cl. .................................. 252/8.55 C; 166/307
[58] Field of Search ................. 252/8.55 B, 8.55 C; 166/307, 304

[56] References Cited

U.S. PATENT DOCUMENTS

| | | | |
|---|---|---|---|
| 2,125,429 | 8/1938 | Denker | 252/8.55 |
| 2,214,363 | 9/1940 | de Simo et al. | 252/8.55 |
| 2,356,205 | 8/1944 | Blair et al. | 252/8.55 |
| 3,083,158 | 3/1963 | Markham | 252/8.55 |
| 3,279,541 | 10/1966 | Knox et al. | 166/304 X |
| 4,207,193 | 6/1980 | Ford et al. | 252/8.55 |

OTHER PUBLICATIONS

Moore et al, *Journal of Petroleum Technology*, Sep. 1965, pp. 1023-1028.

*Primary Examiner*—Herbert B. Guynn
*Attorney, Agent, or Firm*—Robert A. Kent

[57] ABSTRACT

An anti-sludging agent for enhancing the recovery of sludging oil crudes from hydrocarbon-bearing formations during acid stimulation treatments comprising an admixture of dicyclopentadiene and a mixture of naturally occurring cyclic monoterpenes isolated from Pinus species which is added in at least a sludge-inhibiting amount to the acid used for stimulation.

10 Claims, No Drawings

COMPOSITION AND METHOD FOR REDUCING SLUDGING DURING THE ACIDIZING OF FORMATIONS CONTAINING SLUDGING CRUDE OILS

BACKGROUND OF THE INVENTION

1. Field of the Invention

The invention relates to the use of an admixture of compounds as an anti-sludge agent in an acid environment and, more particularly, to the use of a combination of dicyclopentadiene and a naturally occurring mixture of cyclic monoterpenes isolated from Pinus species to reduce the formation of sludge arising from acid stimulation of oil-containing formations which are subject to sludge formation.

2. Prior Art

Various acids are used to stimulate subterranean hydrocarbon-bearing formations. The acid functions to dissolve acid soluble materials in the formation so as to increase the permeability of the formation. The permeability increase is effected by cleaning or enlarging flow channels leading to the well bore allowing more oil or gas to flow to the well bore.

Formation of sludges by certain crude oils on contact with various acids has been recognized as a serious problem in areas of California and Canada for some time. Following acidizing treatments, the wells are very slow to clean up, if at all, and often a large quantity of asphalt-like material is returned with the treatment fluid. Interaction studies between sludging crude oils and acids have shown that precipitated solids or films are formed at the acid oil interface. The precipitates are mainly asphaltenes, resins, paraffins and other high-molecular weight hydrocarbons. No films are observed for non-sludging crudes with acids.

Once the sludges are formed they are often difficult to remove or control. It has been suggested that the best solution to the sludging problem is to prevent sludge formation. An explanation of why and how sludges are formed and some methods of sludge prevention are described in the article entitled "Formation, Effect and Prevention of Asphaltene Sludges During Stimulation Treatments" by E. W. Moore et al, *Journal of Petroleum Technology*, September 1965, pp. 1023–1028.

Methods for preventing or reducing sludge formation include the addition of alkyl phenols, fatty acids, surfactants and the like to stabilize the acid-oil emulsion against sludge formation. The various materials suffer from various problems during use. The anti-sludge agents may be incompatible with other additives such as corrosion inhibitors used in the acid, suffer from poor dispersibility in acids or brines, or be corrosive to metals and the like.

It is an object of this invention to attempt to overcome at least some of the problems experienced by the currently known anti-sludging agents.

SUMMARY OF THE INVENTION

It has been discovered that an admixture comprising a combination of dicyclopentadiene and a naturally occurring mixture of cyclic monoterpenes isolated from Pinus species is useful as an anti-sludging agent in acid treatments of subterranean formations.

Therefore, in accordance with the object of the present invention, there is provided a method for enhancing the recovery of oil during acid stimulation of hydrocarbon-bearing formations containing sludging oils comprising the step of adding with the acid used for stimulation at least a sludge inhibiting amount of an admixture of dicyclopentadiene and a naturally occurring mixture of cyclic monoterpenes isolated from Pinus species, said amount generally being from about 5 to about 50 volume percent and preferably, from about 10 to about 15 volume percent of the stimulation acid.

The naturally occurring mixture of cyclic monoterpenes isolated from the various Pinus species available should have a distillation profile such that less than about five percent (5%) by volume of the monoterpenes have a distillation temperature below about 150° C. and at least 95 percent by volume of the monoterpenes are distilled at a temperature of 180° C. at atmospheric pressure (760 mm Hg).

Optimally, the dicyclopentadiene will comprise from about 0.5 to about 25 percent by volume of the anti-sludging agent.

DETAILED DESCRIPTION OF THE PREFERRED EMBODIMENT

The anti-sludging agent of the present invention comprises an admixture of dicyclopentadiene and a naturally occurring mixture of cyclic monoterpenes isolated from various Pinus species. The dicyclopentadiene comprises from about 0.5 to about 25 percent by volume of the anti-sludging agent. Preferably, the dicyclopentadiene comprises from about 0.5 to about 10 percent by volume and, most preferably, from about 0.5 to about 5 percent by volume of the anti-sludging agent.

The naturally occurring mixture of monoterpenes isolated from Pinus species comprises those natural products having a distillation profile such that less than five (5) percent by volume of the terpenes have a distillation temperature below about 150° C. and at least 95 percent by volume of the terpenes have a distillation temperature less than about 180° C. when distilled at atmospheric pressure (760 mm Hg). The mixture of terpenes can comprise from about 75 percent to about 99.5 percent by volume of the anti-sludging agent.

The effectiveness of the anti-sludging agent of the present invention is surprising in that the principal component, the naturally occurring mixture of monoterpenes, is not a very efficient solvent for the sludge materials. That is, the terpenes are only marginally effective at dissolving precipitated asphaltenes or paraffin waxes by themselves, yet in combination with the dicyclopentadiene, even when present in a very small quantity, results in an increase in dissolving efficiency over that of the terpenes alone.

The anti-sludging agent is present in the acid stimulation system in an amount of from about 5 percent to about 50 percent by volume of the aqueous acid present. Preferably, the anti-sludging agent is present in an amount of from about 5 to about 25 percent by volume and, most preferably, from about 10 to about 15 percent by volume of the aqueous acid. It is to be understood that larger quantities of the anti-sludging agent can be utilized, but such quantities are generally unnecessary for effecting reduction in the sludging of the sludging crude oil upon contact with the acid system.

The anti-sludging agent of the present invention has been found to be compatible with most other compounds required for use in acidizing formations containing sludging crude oils. The anti-sludging agent can be readily dispersed in the acid used for the acidizing process by addition of a surfactant of the class known as dispersing or dispersing-demulsifying surfactants. The dispersing is concerned with the distribution of the anti-sludging agent into the acid system whereas the demulsifying is concerned with the breakdown of the water-in-oil emulsion provoked by the acid stimulation system being in contact with the hydrocarbon-containing subterranean formation.

The dispersing surfactants are generally alkoxylates of mono- or poly-functional alcohols such as hexyl alcohols, octyl alcohols, $C_6$–$C_{10}$ alcohols, ethylene glycol and the like reacted with from about 1 to 30 moles of either or both ethylene oxide and propylene oxide.

The dispersing-demulsifying surfactants are generally alkoxylated polyols such as ethylene glycol, propylene glycol, polypropylene glycol with varying amounts of ethylene or propylene oxide reacted therewith.

The anti-sludging agents also can be used with demulsifying surfactants. Demulsifying surfactants are generally an alkoxylated alkyl phenol formaldehyde resin or the like. The resins generally are butyl, nonyl or dinonyl phenol formaldehyde resins with varying quantities of ethylene oxide or propylene oxide.

The anti-sludging agent also may be used in conjunction with a mutual solvent to obtain good physical properties of the acid stimulation system fluid as well as function as a carrier for other additives such as corrosion inhibitors. The mutual solvent generally comprises a form of an ethoxylated ether or the like, such as ethylene glycol monobutyl ether or an admixture with various ethoxylated alcohols.

The anti-sludging agent is conventionally admixed with the acid at the well site. Generally, the acid will comprise an aqueous mineral acid, such as hydrochloric acid, hydrofluoric acid, organic acids, such as for example, citric acid, formic acid, acetic acid and gluconic acid, mineral acid/organic acid mixtures, or the like, and the anti-sludging agent is admixed witn the acid in a sludge-inhibiting amount, which generally is an amount of from about 10 to about 15 percent by volume. The stimulation fluid, while comprising primarily the mineral acid, usually contains in addition to the anti-sludging agent, a dispersing or demulsifying surfactant, a corrosion inhibitor such as a heterocyclic alkyl pyridine or quaternary amine plus an acetylenic alcohol such as octynol plus a demulsifying agent such as an alkoxylated resin or polyol.

To further illustrate the invention, and not by way of limitation, the following example is provided.

EXAMPLE

To illustrate the effectiveness of the composition of the present invention, the following test was performed utilizing various paraffin waxes.

Two liquid solvent samples were prepared having the following composition. The first solvent comprised an admixture of naturally occurring monoterpenes as previously described.

The second solvent sample comprised the anti-sludging agent of the present invention comprising the previously described naturally occurring mixture of monoterpenes in admixture with one percent by volume of dicyclopentadiene.

A quantity of each liquid solvent then was placed in a glass beaker containing a quantity of a paraffin wax selected from the group consisting of a $C_{20}$ to $C_{28}$ paraffin, tetracosane or dotriacontane at ambient temperature for several hours after which the extent of dissolution by the anti-sludging agent was determined. The results of the tests are set forth in the Table, below.

TABLE

| Solvent | $C_{20}$ to $C_{28}$ Paraffin | | Tetracosane | | Dotriacontane | |
| --- | --- | --- | --- | --- | --- | --- |
| | Time (Hrs.) | Percent Dissolved | Time (Hrs.) | Percent Dissolved | Time (Hrs.) | Percent Dissolved |
| 1 | 17 | 81 | 1½ | 28 | 2½ | 87 |
| 2 | 17 | 89 | 1½ | 100 | 2½ | 100 |

The foregoing data clearly illustrates the surprising superiority of the anti-sludging agent of the present invention in comparison to the effectiveness of its principal component, alone.

While that which applicants presently consider to be the preferred embodiment of the present invention has been described herein, it is to be understood that changes and modifications can be made to the composition and method without departing from the spirit or scope of the invention as defined by the following claims:

What is claimed is:

1. A method for enhancing the recovery of sludging crude oils during acid stimulation of hydrocarbon-bearing formations comprising the of adding to the aqueous acid used for stimulation a sludge-inhibiting amount of an anti-sludge agent comprising an admixture of from about 0.5 to about 25 percent by volume dicyclopentadiene and from about 75 to about 99.5 percent by volume of a mixture of naturally occurring cyclic monoterpenes isolated from Pinus species having a distillation profile such that no more than about 5 percent by volume has a distillation temperature less than about 150° C. and at least 95 percent by volume has a distillation temperature below about 180° C. at a pressure of 760 mm Hg.

2. The method of claim 1 wherein said dicyclopentadiene is present in said anti-sludge agent in an amount of from about 0.5 to about 10 percent by volume.

3. The method of claim 1 wherein said dicyclopentadiene is present in said anti-sludge agent in an amount of from about 0.5 to about 5 percent by volume.

4. The method of claim 1 wherein said anti-sludge agent is present in said acid in an amount of from about 5 to about 50 percent by volume of said acid.

5. The method of Claim 1 wherein said anti-sludge agent is present in said acid in an amount of from about 5 to about 25 percent by volume of said acid.

6. The method of claim 1 wherein said anti-sludge agent is present in said acid in an amount of from about 10 to about 15 percent by volume of said acid.

7. The method of claim 1 wherein said dicyclopentadiene is present in said anti-sludge agent in an amount of from about 0.5 to about 5 percent by volume and said anti-sludge agent is present in said acid in an amount of from about 10 to about 15 percent by volume of said acid.

8. An anti-sludging agent comprising from about 0.5 to about 25 percent by volume dicyclopentadiene and from about 75 to about 99.5 percent by volume of a mixture of naturally occurring cyclic monoterpenes isolated from Pinus species having a distillation profile such that no more than about 5 percent by volume has a distillation temperature less than about 150° C. and at least 95 percent by volume has a distillation temperature below about 180° C. at a pressure of 760 mm Hg.

9. The composition of claim 8 wherein said dicyclopentadiene is present in an amount of from about 0.5 to about 10 percent by volume.

10. The composition of claim 8 wherein said dicyclopentadiene is present in an amount of from about 0.5 to about 5 percent by volume.

* * * * *

UNITED STATES PATENT AND TRADEMARK OFFICE
CERTIFICATE OF CORRECTION

PATENT NO. : 4,663,059
DATED : May 5, 1987
INVENTOR(S) : Ford et al.

It is certified that error appears in the above-identified patent and that said Letters Patent is hereby corrected as shown below:

In Column 4, line 23, following the words, "comprising the", the word "step" was omitted.

In Column 4, line 24, following the word, "stimulation", the words "at least" were omitted.

Signed and Sealed this

First Day of September, 1987

Attest:

DONALD J. QUIGG

Attesting Officer

Commissioner of Patents and Trademarks